(12) United States Patent
Zuercher et al.

(10) Patent No.: US 7,519,505 B2
(45) Date of Patent: Apr. 14, 2009

(54) METHOD AND SYSTEM FOR ESTIMATING THE EFFICIENCY RATING OF A COMPRESSED AIR SYSTEM

(75) Inventors: Jan Zuercher, Spanish Fort, AL (US); Dean Smith, Powder Springs, GA (US)

(73) Assignee: Coltec Industries, Inc., Charlotte, NC (US)

( * ) Notice: Subject to any disclaimer, the term of this patent is extended or adjusted under 35 U.S.C. 154(b) by 211 days.

(21) Appl. No.: 11/135,127

(22) Filed: May 23, 2005

(65) Prior Publication Data

US 2005/0278144 A1   Dec. 15, 2005

Related U.S. Application Data

(60) Provisional application No. 60/573,507, filed on May 21, 2004.

(51) Int. Cl.
G06F 11/30 (2006.01)
(52) U.S. Cl. .................................................... 702/182
(58) Field of Classification Search ................ 702/182
See application file for complete search history.

(56) References Cited

U.S. PATENT DOCUMENTS

| | | | |
|---|---|---|---|
| 3,350,928 A | 11/1967 | Fedde | |
| 4,483,152 A | 11/1984 | Bitondo | |
| 6,438,981 B1 * | 8/2002 | Whiteside | 62/228.1 |
| 6,529,590 B1 | 3/2003 | Centers | |
| 6,662,584 B1 * | 12/2003 | Whiteside | 62/230 |
| 6,834,510 B1 | 12/2004 | Pfister et al. | |
| 6,928,389 B2 * | 8/2005 | Saunders | 702/182 |
| 6,973,410 B2 * | 12/2005 | Seigel | 702/182 |
| 2001/0048376 A1 | 12/2001 | Maeda et al. | |
| 2002/0173929 A1 * | 11/2002 | Seigel | 702/130 |
| 2002/0188422 A1 * | 12/2002 | DeRose et al. | 702/182 |
| 2004/0068390 A1 | 4/2004 | Saunders | |

OTHER PUBLICATIONS

International Search Report mailed Oct. 13, 2006 corresponding to PCT/US 05/17907.

* cited by examiner

*Primary Examiner*—Tung S Lau
*Assistant Examiner*—Aditya Bhat
(74) *Attorney, Agent, or Firm*—Holland & Hart LLP

(57) ABSTRACT

A method for rating the efficiency of a compressed air system is provided comprising, (a) selecting a plurality of efficiency factors, (b) selecting a set of conditions for each efficiency factor, (c) assigning a numerical value to each condition, (d) determining a score for the efficiency factor by comparing the current condition with the preselected conditions and assigning the numerical value associated with the closest preselected condition, and (e) calculating a total efficiency score by adding the scores from the plurality of efficiency factors.

21 Claims, 3 Drawing Sheets

| COMPRESSED AIR SYSTEM EFFICIENCY | | |
|---|---|---|
| Efficiency Quotient Rating | | |
| Supply Side EQ Rating | score | enter this value for each condition that applies |
| Rotary / Recip Control Mode | 0 | VSD or Variable Displacement |
| | 1 | Load/Unload |
| | 5 | Modulation |
| Supply Side Storage | 0 | 10 gallons / cfm of largest compressor |
| | 1 | 5 gallons / cfm of largest compressor |
| | 2 | 3 gallons / cfm of largest compressor |
| | 3 | <3 gallons / cfm of largest compressor |
| | 4 | 1 or less gallons / cfm of largest compressor |
| Centrifugal Compressor Blowoff | 0 | No blowoff valves ever open |
| | 2 | One blowoff valve open occasionally |
| | 4 | One blowoff valve open often |
| | 6 | Two blowoff valves open at times |
| | 10 | More than two blowoff valves open |
| Multiple Compressor Automation | 0 | PLC based rate of change automation |
| | 2 | Compressor manufacturer network sequencer |
| | 3 | Pressure switch sequencer |
| | 4 | none - manual rotation |
| Compressor & Equipment Maintenance | 0 | Professional Service Contract |
| | 1 | Preventive in-house maintenance |
| | 3 | Repair only maintenance |
| | 5 | Repair only maintenance; experiencing reliability issues |
| Compressor Room Conditions | 0 | Clean and well ventilated |
| | 2 | Elevated temperatures |
| | 2 | Dusty or dirty air |
| | 2 | Poor cooling water treatment |
| Air Treatment - Dryers | 0 | Cycling refrigerated dryers |
| | 1 | Non-cycling refrigerated dryers |
| | 2 | heat of compression dryers |
| | 4 | Heated blower desiccant dryers |
| | 6 | Heated desiccant dryers |
| | 10 | Heatless desiccant dryers |
| Air Treatment - total pressure drop | 0 | <2 psid |
| | 1 | <5 psid |
| | 3 | <10 psid |
| | 5 | >10 psid |
| Total Supply System Score | | (100 - score) relative to 100% of potential efficiency, minimal wasted air |
| Supply System EQ Rating | % | relative to 100% of potential efficiency |

| COMPRESSED AIR SYSTEM EFFICIENCY | | | |
|---|---|---|---|
| Efficiency Quotient Rating | | | |
| Supply Side EQ Rating | score | | enter this value for each condition that applies |
| | | | |
| Rotary / Recip Control Mode | | 0 | VSD or Variable Displacement |
| | | 1 | Load/Unload |
| | | 5 | Modulation |
| | | | |
| Supply Side Storage | | 0 | 10 gallons / cfm of largest compressor |
| | | 1 | 5 gallons / cfm of largest compressor |
| | | 2 | 3 gallons / cfm of largest compressor |
| | | 3 | <3 gallons / cfm of largest compressor |
| | | 4 | 1 or less gallons / cfm of largest compressor |
| | | | |
| Centrifugal Compressor Blowoff | | 0 | No blowoff valves ever open |
| | | 2 | One blowoff valve open occasionally |
| | | 4 | One blowoff valve open often |
| | | 6 | Two blowoff valves open at times |
| | | 10 | More than two blowoff valves open |
| | | | |
| Multiple Compressor Automation | | 0 | PLC based rate of change automation |
| | | 2 | Compressor manufacturer network sequencer |
| | | 3 | Pressure switch sequencer |
| | | 4 | none - manual rotation |
| | | | |
| Compressor & Equipment Maintenance | | 0 | Professional Service Contract |
| | | 1 | Preventive in-house maintenance |
| | | 3 | Repair only maintenance |
| | | 5 | Repair only maintenance; experiencing reliability issues |
| | | | |
| Compressor Room Conditions | | 0 | Clean and well ventilated |
| | | 2 | Elevated temperatures |
| | | 2 | Dusty or dirty air |
| | | 2 | Poor cooling water treatment |
| | | | |
| Air Treatment - Dryers | | 0 | Cycling refrigerated dryers |
| | | 1 | Non-cycling refrigerated dryers |
| | | 2 | heat of compression dryers |
| | | 4 | Heated blower desiccant dryers |
| | | 6 | Heated desiccant dryers |
| | | 10 | Heatless desiccant dryers |
| | | | |
| Air Treatment - total pressure drop | | 0 | <2 psid |
| | | 1 | <5 psid |
| | | 3 | <10 psid |
| | | 5 | >10 psid |
| | | | |
| Total Supply System Score | | | (100 - score) relative to 100% of potential efficiency, minimal wasted air |
| | | | |
| Supply System EQ Rating | % | | relative to 100% of potential efficiency |

FIG.1

| COMPRESSED AIR SYSTEM EFFICIENCY | | |
|---|---|---|
| Efficiency Quotient Rating | | |
| Demand Side EQ Rating | score | enter this value for each condition that applies |
| | ← ↓ | |
| Artificial Demand | 1 | <80 psig plant header pressure |
| | 3 | <90 psig plant header pressure |
| | 5 | <100 psig plant header pressure |
| | 7 | >100 psig plant header pressure |
| | | |
| Open Blowing Applications | 0 | No compressed air blowing or use low pressure blowers only |
| | 1 | Minimal blowing applications using engineered nozzles |
| | 3 | Some compressed air blowing using tubing or pipe manifolds |
| | 5 | Significant use of compressed air blowing on product or equipment |
| | | |
| Inappropriate or Inefficient Uses | 5 | Significant use of air <45 psig but compressed to >90 psig |
| | 4 | Conveying of material with compressed air (not blowers) |
| | 4 | Large or multiple pulse type baghouses or dust collectors |
| | 2 | Sparging, mixing of liquids with compressed air |
| | 2 | Vibrators or agitators powered by compressed air |
| | 2 | Other: diaphragm pumps, filter presses, |
| | | |
| Leaks | 1 | Aggressive leak repair program including ultrasonic scanning |
| | 3 | Semi or annual leak repair effort |
| | 5 | No leak management but do repair large or obvious leaks |
| | 7 | Minimal effort on leak repairs |
| | | |
| Idle Production Equipment | 0 | Automatic shutoff of compressed air to idle production equipment |
| | 2 | Manual shutoff of compressed air to idle production equipment |
| | 4 | No shutoff of compressed air to idle production equipment |
| | | |
| Condensate Drain Losses | 0 | All demand style drains well maintained |
| | 2 | Mix of demand and solenoid drains |
| | 3 | Timed solenoid drains |
| | 5 | Partially open valves or drain bypasses |
| | | |
| Total Demand Side Score | | |
| | | |
| Demand Side EQ Rating | % | (100 - score) relative to 100% of potential efficiency, minimal wasted air |

FIG. 2

| Compressed Air System Efficiency Quotient Summary | | | |
|---|---|---|---|
| Supply Side EQ Rating | % | | |
| Demand Side EQ Rating | % | | |
| (Demand EQ + Supply EQ) / 2 = | % | = SYSTEM EQ RATING | |
| | >95% | Opportunities exists but return on investment may not be attractive | |
| | >90% | Operating cost reductions of 5-10% exists which should provide an attractive ROI | |
| | >85% | Operating cost reductions of 15-20% exists which should provide an attractive ROI | |
| | >80% | Operating cost reductions of 20-30% exists which should provide an attractive ROI | |
| | >75% | Operating cost reductions of 30-40% exists which should provide an attractive ROI | |
| | >70% | Operating cost reductions of 40-50% exists which should provide an attractive ROI | |
| | >65% | Operating cost reductions of >50% exists which should provide an attractive ROI | |
| OPERATING COSTS ESTIMATE | $ | | |
| from worksheet | | | |
| Cost reduction opportunity based on EQ Rating | | % | |
| Cost Reduction Opportunity | $ | | |

FIG. 3

METHOD AND SYSTEM FOR ESTIMATING THE EFFICIENCY RATING OF A COMPRESSED AIR SYSTEM

CROSS REFERENCE TO RELATED APPLICATIONS

The present application claims priority under 35 U.S.C. § 119(e) from U.S. Provisional Patent Application Ser. No. 60/573,507 filed May 21, 2004, entitled "METHOD AND SYSTEM FOR RATING THE EFFICIENCY OF A COMPRESSED AIR SYSTEM AND IMPROVING THE EFFICIENCY OF A COMPRESSED AIR SYSTEM", the disclosure of which is incorporated herein by reference.

FIELD OF THE INVENTION

The present invention relates to a method and system for rating the efficiency of a compressed air system. More particularly, the present invention relates to a weighted test of various compressed air system components resulting in a measurement of the overall efficiency of the system.

BACKGROUND OF THE INVENTION

Compressed air systems are used in a variety of industrial settings and manufacturing facilities. In the U.S., compressed air systems account for $1.5 billion per year in energy costs. In fact, it is estimated that compressed air systems account for 10% of all electricity used in U.S. manufacturing. In some industries, compressed air systems account for 30% or more of the total energy cost of a manufacturing facility. Many industries use compressed air systems as power sources for tools and equipment used for pressurizing, atomizing, agitating, and mixing applications.

The costs associated with a typical compressed air system are generally broken down as follows: equipment and installation costs account for about 12% of the lifetime cost of the system; maintenance and downtime account for about 12% of the lifetime cost of the system; and electricity (power) accounts for about 76% of the lifetime cost of the system. Thus, maximizing the efficiency of the system to provide more air using less energy will provide the greatest area for lifetime cost reduction for a compressed air system.

Recently, there have been many attempts to identify inefficiencies in compressed air systems and optimize those systems through intelligent control systems and/or specially designed equipment. Compressed air system optimization can result in a 20-50% savings in energy, and the costs associated with improvements and additional hardware and software are often paid back in 1-3 years or less.

A problem lies in the ability to accurately predict the efficiency of a compressed air system and identify the weak points. Before a facility will commit to spending money on new compressed air system components, operating software, or further analysis of the system, a payback period or return on investment must show that these changes are economically advantageous.

It is, therefore, desirable to provide a method for determining the efficiency of a compressed air system such that improvements to the system can be quantified and measured against a current efficiency and a maximum efficiency. This will better assist decision makers when evaluating compressed air system changes.

SUMMARY OF THE INVENTION

In a first aspect of the present invention, a method for rating the efficiency of a compressed air system is provided comprising, (a) selecting a plurality of efficiency factors, (b) selecting a set of conditions for each efficiency factor, (c) assigning a numerical value to each condition, (d) determining a score for the efficiency factor by comparing the current condition with the preselected conditions and assigning the numerical value associated with the closest preselected condition, and (e) calculating a total efficiency score by adding the scores from the plurality of efficiency factors.

In one embodiment of the present invention, the plurality of efficiency factors comprise at least one of: CONTROL MODE, SUPPLY SIDE STORAGE, CENTRIFUGAL COMPRESSOR BLOWOFF; MULTIPLE COMPRESSOR AUTOMATION, COMPRESSOR MAINTENANCE, COMPRESSOR ROOM CONDITIONS, AIR TREATMENT, and PRESSURE DROP.

In another embodiment of the present invention, the plurality of efficiency factors comprise at least one of: ARTIFICIAL DEMAND, OPEN BLOWING APPLICATIONS, INAPPROPRIATE USES, LEAKS, IDLE EQUIPMENT, and CONDENSATE DRAIN LOSS.

In a further embodiment of the present invention, the set of conditions for each efficiency factor comprise known operational states for the particular efficiency factor which can have an impact on the overall efficiency of the compressed air system. Further, a set of conditions for an efficiency factor is assigned values proportional to the variation of that condition from an optimal condition for the efficiency factor. In a preferred embodiment of the present invention, the numerical value for each condition is proportional to the overall impact of the particular condition on the overall efficiency of the compressed air system relative to the other conditions.

In a still further embodiment of the present invention, the current condition is measured through visual observation by a user. In an alternate embodiment of the present invention, the current condition is measured through at least one of mechanical or electronic measuring devices.

In an additional embodiment of the present invention, a supply side efficiency score is calculated separately from a demand side efficiency score. The total efficiency score is calculated by adding the supply side score and the demand side score. An additional embodiment will include calculating an efficiency rating by comparing the total efficiency score to the total efficiency score for an optimal system.

In a second aspect of the present invention, a method for rating the efficiency of a compressed air system is provided comprising, (a) comparing a plurality of current conditions of the system corresponding to a plurality of conditions corresponding to predetermined efficiency factors within a compressed air system, (b) determining a score for an efficiency factor based on the predetermined numerical value assigned to a preselected condition most closely approximating the current condition, and (c) calculating a total efficiency score for the compressed air system by adding the individual scores for each efficiency factor.

In one embodiment of the present invention, the plurality of efficiency factors comprise at least one of: CONTROL MODE, SUPPLY SIDE STORAGE, CENTRIFUGAL COMPRESSOR BLOWOFF; MULTIPLE COMPRESSOR AUTOMATION, COMPRESSOR MAINTENANCE, COMPRESSOR ROOM CONDITIONS, AIR TREATMENT, and PRESSURE DROP.

In another embodiment of the present invention, the plurality of efficiency factors comprise at least one of: ARTIFICIAL DEMAND, OPEN BLOWING APPLICATIONS, INAPPROPRIATE USES, LEAKS, IDLE EQUIPMENT, and CONDENSATE DRAIN LOSS.

In a further embodiment of the present invention, the set of conditions for each efficiency factor comprise known operational states for the particular efficiency factor which can have an impact on the overall efficiency of the compressed air system. Further, a set of conditions for an efficiency factor is assigned values proportional to the variation of that condition from an optimal condition for the efficiency factor. In a preferred embodiment of the present invention, the numerical value for each condition is proportional to the overall impact of the particular condition on the overall efficiency of the compressed air system relative to the other conditions.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

So that the manner in which the above-recited features, advantages and objects of the invention, as well as others which will become more apparent, are obtained and can be understood in detail, a more particular description of the invention briefly summarized above may be had by reference to the embodiment thereof which is illustrated in the appended drawings, which drawings form a part of the specification and wherein like characters of reference designate like parts throughout the several views. It is to be noted, however, that the appended drawings illustrate only preferred and alternative embodiments of the invention and are, therefore, not to be considered limiting of its scope, as the invention may admit to additional equally effective embodiments.

BRIEF DESCRIPTION OF THE DRAWINGS

FIG. 1 is a worksheet illustrating the factors and conditions employed to determine the Supply Side Efficiency of a compressed air system according to one embodiment of the present invention.

FIG. 2 is a worksheet illustrating the factors and conditions employed to determine the Demand Side Efficiency of a compressed air system according to one embodiment of the present invention.

FIG. 3 is a worksheet illustrating the calculation of the total compressed air system efficiency rating as well as the cost reduction opportunity based on that efficiency according to one embodiment of the present invention.

DETAILED DESCRIPTION

The present invention provides a method and system for rating the efficiency of a compressed air system. Compressed air systems generally comprise at least one compressor and at least one device consuming pressurized air. Additional components such as pressurized storage tanks, piping, and additional end use equipment are also often added to a compressed air system.

In large compressed air systems, for example a manufacturing facility, there are a multitude of points or aspects associated with the system which must be monitored and adjusted to maintain efficient production, distribution, and use of compressed air. A compressor or plurality of compressors may be feeding compressed air to several thousand feet of piping which connects the compressors to dozens of end uses. The system and method of the present invention identifies the various points or aspects associated with this compressed air system and determines the relative efficiency of each of these points or aspects, then calculates the overall compressed air system efficiency, based on these individual factors.

The first step in the method of the present invention is to select a plurality of efficiency factors. The efficiency factors are preferably selected to reflect the points or aspects within the compressed air system which most predominately effect the overall efficiency of the system. The number and specific factors will vary depending upon the type and complexity of the system. For example, a compressed air system comprising one compressor and one tool employing compressed air will generally have fewer efficiency factors than a large compressed air system comprising a plurality of compressors, thousands of feet of piping, pressure storage vessels and several tools employing the compressed air.

In one embodiment of the present invention, the efficiency factors are separated into two categories, Supply Side Efficiency Factors and Demand Side Efficiency Factors. A supply side efficiency rating and a demand side efficiency rating may be compiled independently of one another. Compiling separate efficiency ratings for supply side and demand side provides the advantage of separating the manufacture of compressed air from the use of the compressed air and facilitating the identification of problem areas and inefficiencies in each area.

Generally, the supply side efficiency factors comprise those associated with the production and supply side storage of compressed air. In a preferred embodiment of the present invention, these factors comprise one or more of: CONTROL MODE, SUPPLY SIDE STORAGE, CENTRIFUGAL COMPRESSOR BLOWOFF, MULTIPLE COMPRESSOR AUTOMATION, COMPRESSOR MAINTENANCE, COMPRESSOR ROOM CONDITIONS, AIR TREATMENT, and PRESSURE DROP.

The demand side efficiency factors comprise those relating to the end use of the compressed air and the air delivery to the production equipment. In a preferred embodiment of the present invention, the demand side efficiency factors comprise one or more of: ARTIFICIAL DEMAND, OPEN BLOWING APPLICATIONS, INAPPROPRIATE USES, LEAKS, IDLE EQUIPMENT, and CONDENSATE DRAIN LOSS.

Once the efficiency factors are selected, a plurality of conditions for each factor are determined. There is a correlation between the various operating levels for a condition and the efficiency of that particular condition. For example, one efficiency factor associated with a compressed air system is the pressure drop between the compressor output and the tool input. An optimal condition for this efficiency factor is as close to 0 psi pressure drop as possible. As the amount of the pressure drop increases, the efficiency decreases. Therefore, a range of pressure drop conditions, for example, 0-2 psi, 2-6 psi, 5-10 psi, and greater than 10 psi, is determined. Values are then assigned for each condition corresponding to the degree of lost efficiency based upon the deviation of the particular condition from an optimal, or most, efficient, condition.

This process is repeated until each efficiency factor has a plurality of conditions associated with it, and in turn, each condition has a value corresponding to the impact of that particular condition on the efficiency factor. In this manner, the overall efficiency of the compressed air system is represented by a plurality of efficiency factors which are determined through their current conditions and the impact of those conditions on the efficiency of the system.

Various numerical methods of calculation may be employed to calculate the total efficiency of the compressed air system. In the preferred embodiment of the present invention, the optimal range for each condition is given a value of "0" indicating no further efficiency can be realized by changing this specific condition. Similarly, a larger value is assigned for conditions which reflect poor performance of a specific efficiency factor. Thus, a total score obtained by adding the various scores of the efficiency factors together which approaches 0 represents a nearly 100% efficiency system. Correspondingly, a higher total score represents a system which is not near optimal efficiency and opportunities exist to improve the overall efficiency of the system. However, in another embodiment of the present invention the reverse scheme is employed wherein an optimal condition receives a higher value than a less than optimal condition.

Once the efficiency factors have been chosen, conditions selected, and values assigned, a score for each efficiency factor is determined by comparing the current condition to the preselected conditions. The current condition may de determined through the knowledge of those familiar with the compressed air system or through measurement. If the current condition is determined based on an individual's knowledge or estimation, further refinement of the current condition may be accomplished through direct measurement of the system. Depending upon the efficiency factor, these measurements may be taken visually, or manually by a user, or the measurement may be taken by mechanical or electrical means.

After a current condition is determined, the current condition is compared with the preselected conditions for that efficiency factor, and once a match or approximate match is found the value associated with that preselected condition is scored for the efficiency factor. The current condition for each factor is similarly determined and associated with a corresponding predetermined condition to determined the appropriate value to score for the efficiency factor. Once all efficiency factors have been determined and values assigned based upon the predetermined condition values, a total efficiency score is calculated by adding together the individual efficiency factor values.

In a second aspect of the present invention, the method for rating the efficiency of a compressed air system is enhanced through the use of a data logger to measure and record operating information and other aspects of the compressed air system. A data logger is a device comprising sensors operable to detect various conditions within a compressed air system, and preferably a memory to store the sensed conditions and a display means or communication means to transmit the data to a user or computer. These conditions include vital compressed air system data at various points or aspects along or within the system such as power consumption, pressure, temperature, and flowrate.

The data logger facilitates gathering of the information necessary to calculate the efficiency rating according to the method described herein. The data logger also tracks changes in these values over time to obtain a more accurate picture of the operating conditions of a compressed air system over the course of an extended period of time.

In another aspect of the present invention, a computer is employed to calculate the efficiency rating of a compressed air system. The computer may comprise a desktop, laptop, or handheld computer device loaded with a program operable to accepting compressed air system information and compute the efficiency rating based on the above-described method. In one embodiment of the present invention, the efficiency factors, conditions and values are preprogrammed into the computer program. A user or data logger gathers current conditions from the compressed air system and enters or otherwise transmits said current conditions to the computer. The computer then calculates the compressed air system efficiency based upon the predetermined values for the preselected conditions for each efficiency factor.

In a further embodiment of the present invention, the data is communicated to a remote computer through a user interface connected to a network, such as the Internet. A user enters the compressed air system current conditions through a website or other such interface, then the data is transmitted over the network to the remote computer which is preprogrammed with the efficiency factors, conditions, and values. The remote computer processes the data by associating the current conditions with a preselected condition and assigning the associated value to the particular factor. The efficiency is calculated and either returned to the user through the network interface, stored for future use, or sent to a third party.

In another embodiment of the present invention, a data logger is employed in direct communication with a computer to directly communicate compressed air system information to the computer for manipulation. In one embodiment of the present invention, the data is passed from the data logger to a computer connected to the Internet for uploading to a central computational computer. In an alternate embodiment of the present invention, the software resides on a desktop computer or other such onsite computer loaded with the proper software for such data manipulation.

Once the efficiency rating of a compressed air system is known and calculated according to one embodiment of the present invention, the efficiency of the compressed air system can be estimated for various changes and modifications by entering revised figures for the efficiency factors of the various points or aspects associated with the compressed air system. Through this improvement modeling, the cost of the modification and improvements can be directly compared to the increase in efficiency and reduction in operating cost that each change will have on the overall system.

In another embodiment of the present invention, the model system may include the cost of the new hardware, software, savings in energy consumption, savings in maintenance and downtime of the system and reduced rental cost for rented hardware during maintenance periods. Through these figures and calculations, the total payback period is calculated to determine how long the model system will take to pay off the changes made therein. The total payback period thus provides a concrete result to aid a decision maker in determining the proper changes to make to the compressed air system.

The system and method of a preferred embodiment of the present invention will now be described with reference to the particular embodiment shown in FIGS. 1-3.

FIG. 1 illustrates a worksheet employed in a preferred embodiment of the present invention to determine the supply side efficiency rating. The supply side efficiency rating comprises the following efficiency factors: Control Mode; Supply Side Storage; Centrifugal Compressor Blowoff; Multiple Compressor Automation; Compressor and Equipment Maintenance; Compressor Room Conditions; Air Treatment—Dryers; and Air Treatment—total pressure drop.

FIG. 2 illustrates a worksheet employed in a preferred embodiment of the present invention to determine the demand side efficiency rating. The demand side efficiency factors comprise: Artificial Demand; Open Blowing Appliances; Inappropriate or Inefficient Uses; Leaks; Idle Production Equipment; and Condensate Drain Lines.

Each of the efficiency factors for both the supply side and demand side are further broken down into a series of conditions common to that factor. Each condition is assigned a numerical value that is related to the degree at which that condition detracts from the optimal efficiency for the particular factor. Values are assigned for each factor, and the total of all factors is used to determine the supply and demand side efficiency by subtracting the total from 100.

A separate calculation and efficiency factor is computed for the supply side and the demand side. FIG. 3 illustrates the total efficiency rating of the compressed air system of a preferred embodiment of the present invention as the average of the supply side efficiency rating and the demand side efficiency rating. This efficiency rating is demonstrative of the efficiency of the compressed air system expressed as a percent of the optimum efficiency for the system.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. A method for estimating the efficiency of a compressed air system comprising:
   (a) providing a computer implemented checklist including various items related to components and/or current observed conditions of a compressed air system, the compressed air system including a supply side and a demand side, the supply side including equipment in or near compressor room(s), the demand side including at least one process or production end use, the checklist further including, for each component and/or current observed condition two or more values that correspond to two or more possible conditions, the values being weighted to represent the respective impact of the current observed condition on the estimated efficiency of the compressed air system;
   (b) manually observing a compressed air system to determine the current observed condition for each item in the checklist;
   (c) selecting the closest value for each item from the two or more values in the checklist by comparing, for each item, the current observed condition with the set of possible conditions listed in the checklist and assigning the value associated with the condition that is the closest match to the current observed condition, and when it is determined that the current observed condition for an item lies between two of the possible conditions listed in the checklist (i) interpolating a value based on the observed condition and two possible conditions listed in the checklist and (ii) assigning the interpolated value as the score for the item;
   (d) calculating a supply side system rating based on the selected values for the supply side;
   (e) calculating a demand side system rating based on the selected values for the demand side;
   (f) calculating an estimated total efficiency rating for the compressed air system based on the average of the supply and demand side system ratings; and
   (g) outputting the estimated total efficiency rating.

2. The method of claim 1, wherein the checklist includes items related to supply side components and/or current observed conditions that comprise at least one of: CONTROL MODE, SUPPLY SIDE STORAGE, CENTRIFUGAL COMPRESSOR BLOWOFF; MULTIPLE COMPRESSOR AUTOMATION, COMPRESSOR MAINTENANCE, COMPRESSOR ROOM CONDITIONS, AIR TREATMENT-DRYERS, and AIR TREATMENT-TOTAL PRESSURE DROP.

3. The method of claim 1, wherein the checklist includes items related to demand side components and/or current observed conditions that comprise at least one of: ARTIFICIAL DEMAND, OPEN BLOWING APPLICATIONS, INAPPROPRIATE USES, LEAKS, IDLE PRODUCTION EQUIPMENT, and CONDENSATE DRAIN LOSSES.

4. The method of claim 1, wherein the two or more values that correspond to two or more possible conditions for each item comprise known operational states for the particular component and/or current observed condition which can have an impact on the overall efficiency of the compressed air system.

5. The method of claim 1, wherein two or more values that correspond to two or more possible conditions for each item are assigned values proportional to the deviation of the particular component and/or current observed condition from the optimum condition for the item.

6. The method of claim 1, wherein the current observed condition is determined through visual observation by a user.

7. The method of claim 1, wherein the current observed condition is determined through at least one of mechanical or electronic measuring devices.

8. The method of claim 1, wherein the estimated total efficiency rating is compared to a theoretical efficiency for an optimal system.

9. The method of claim 1, further comprising:
   (h) determining an operating costs estimate by summing nominal expected energy costs associated with the operating components of the compressed air system;
   (i) selecting an operating costs reduction percentage from a lookup table that includes estimated total efficiency ratings and corresponding operating costs reduction percentages; and
   (j) determining a costs reduction opportunity as the product of the operating costs estimate and the operating cost reduction percentage.

10. The method of claim 1, wherein the computer implemented checklist is reproduced in paper form prior to said step of manually observing.

11. The method of claim 1, wherein the estimated total efficiency rating is a weighted average of the supply and demand side ratings.

12. The method of claim 1, wherein the estimated efficiency rating result is just the supply side rating, just the demand side rating, or some subset thereof.

13. The method of claim 1, further comprising repeating steps (a) through (g) and comparing previous ratings for the same facility to determine if the estimated efficiency rating is increasing or decreasing.

14. A method for rating the efficiency of a compressed air system, the compressed air system including a supply side and a demand side, comprising:
   (a) observing a plurality of current conditions of the system, each current observed condition corresponding to an item in a computer implemented checklist, each item having two or more values that correspond to two or more possible conditions that may be associated with the current observed condition of the item, each item corresponding to a part of a compressed air system, the supply side of the compressed air system including equipment in or near compressor room(s), the demand side of the compressed air system including at least one process or production end use;
   (b) selecting the closest value for each item from the two or more values in the checklist by comparing, for each item, the current observed condition for the item with the set of possible conditions listed in the checklist and assigning the value associated with the condition that is the closest match to the current observed condition, and when it is determined that the current observed condition for an item lies between two of the possible conditions listed in the checklist (i) interpolating a value based on the observed condition and two possible conditions listed in the checklist (ii) assigned the interpolated value as the score for the item;
   (c) calculating a supply side system rating based on the selected values for the supply side;
   (d) calculating a demand side system rating based on the selected values for the demand side;
   (e) calculating an estimated total efficiency rating for the compressed air system based on the average of the supply and demand side system scores; and
   (f) outputting the estimated total efficiency rating.

15. The method of claim 14, wherein the checklist includes items related to supply side items of the compressed air system that comprise at least one of: CONTROL MODE, SUPPLY SIDE STORAGE, CENTRIFUGAL COMPRESSOR BLOWOFF; MULTIPLE COMPRESSOR AUTOMATION, COMPRESSOR MAINTENANCE, COMPRESSOR ROOM CONDITIONS, AIR TREATMENT-DRYERS, and AIR TREATMENT-TOTAL PRESSURE DROP.

16. The method of claim 14, wherein the checklist includes items related to demand side items of the compressed air system that comprise at least one of: ARTIFICIAL DEMAND, OPEN BLOWING APPLICATIONS, INAPPROPRIATE USES, LEAKS, IDLE EQUIPMENT, and CONDENSATE DRAIN LOSSES.

17. The method of claim 14, wherein the set of conditions for each item comprise known operational states or different types of equipment used for the particular item which can have an impact on the overall efficiency of a compressed air system.

18. The method of claim 14, wherein a set of conditions for an item is assigned values proportional to the deviation of that condition from the optimum condition for the item.

19. The method of claim 14, further comprising:
   (g) determining an operating costs estimate by summing nominal expected energy costs associated with the operating components of the compressed air system;
   (h) selecting an operating costs reduction percentage from a lookup table that includes estimated total efficiency rating and corresponding operating costs reduction percentages; and
   (i) determining a costs reduction opportunity as the product of the operating costs estimate and the operating cost reduction percentage.

20. A method for rating the efficiency of a compressed air system, the compressed air system including a supply side and a demand side, comprising:
   (a) comparing a plurality of current observed conditions for items included in the system to two or more possible conditions for the respective item that are included on a computer implemented checklist, the checklist further including two or more values that correspond, respectively, to the two or more possible conditions, the values being weighted to represent the respective impact of the current observed condition on the estimated efficiency of the compressed air system;
   (b) selecting the closest value for each item from the two or more values in the checklist by comparing, for each checklist item, the current observed condition with the set of possible conditions listed in the checklist and assigning the value associated with the condition that most closely approximates the current observed condition, wherein the value for each condition is proportional to the overall impact of the particular condition on the overall efficiency of the compressed air system, and when it is determined that the current observed condition for an item lies between two of the possible conditions listed in the checklist (i) interpolating a value based on the observed condition and two possible conditions listed in the checklist and (ii) assigning the interpolated value as the score for the item;
   (c) calculating a supply side system rating based on the selected values for the supply side;
   (d) calculating a demand side system rating based on the selected values for the demand side;
   (e) calculating an estimated total efficiency rating for the compressed air system based on the average of the supply and demand side system ratings; and
   (f) outputting the estimated total efficiency rating.

21. The method of claim 20, further comprising:
   (g) determining an operating costs estimate by summing nominal expected energy costs associated with the operating components of the compressed air system;
   (h) selecting an operating costs reduction percentage from a lookup table that includes estimated total efficiency rating and corresponding operating costs reduction percentages; and
   (i) determining a costs reduction opportunity as the product of the operating costs estimate and the operating cost reduction percentage.

* * * * *